United States Patent [19]

Furuhashi

[11] 4,401,073

[45] Aug. 30, 1983

[54] APPARATUS FOR CONTROLLING ROTATIONAL SPEED OF INTERNAL COMBUSTION ENGINE

[75] Inventor: Shoji Furuhashi, Yokohama, Japan

[73] Assignee: Nissan Motor Co., Ltd., Yokohama, Japan

[21] Appl. No.: 154,054

[22] Filed: May 28, 1980

[30] Foreign Application Priority Data

May 31, 1979 [JP] Japan .................... 54-67711

[51] Int. Cl.³ .................................. F02D 11/10
[52] U.S. Cl. ............................ 123/339; 123/320; 123/340; 74/860; 180/170
[58] Field of Search .......... 180/170; 74/860; 123/320, 324, 339

[56] References Cited

U.S. PATENT DOCUMENTS

| | | | |
|---|---|---|---|
| 3,661,131 | 5/1972 | Croft | 123/339 |
| 3,724,433 | 4/1973 | Voss et al. | 123/339 |
| 4,064,747 | 12/1977 | Rackliffe et al. | 123/339 |
| 4,169,437 | 10/1979 | Fleischer | 123/361 |
| 4,237,833 | 12/1980 | Des Lauriers | 123/339 |
| 4,237,838 | 12/1980 | Kinugawa | 123/339 |
| 4,245,599 | 1/1981 | Des Lauriers | 123/361 |

Primary Examiner—Ronald B. Cox
Attorney, Agent, or Firm—Lowe, King, Price & Becker

[57] ABSTRACT

A feedback control system for controlling the rotational speed in idling operation of an internal combustion engine mounted on a vehicle by altering an intake air amount is combined with means for detecting a predetermined engine operating condition where the rotational speed of the engine is decreased or restrained by the vehicle speed and means for limiting a control signal manipulating an intake air amount under a predetermined upper limit in the case where the predetermined engine operating condition is detected so that the control system is prevented from excessively increasing an intake air amount. Preferably the operation of the limiting means as well as the operation of the feedback control is performed by a programmed microcomputer.

16 Claims, 2 Drawing Figures

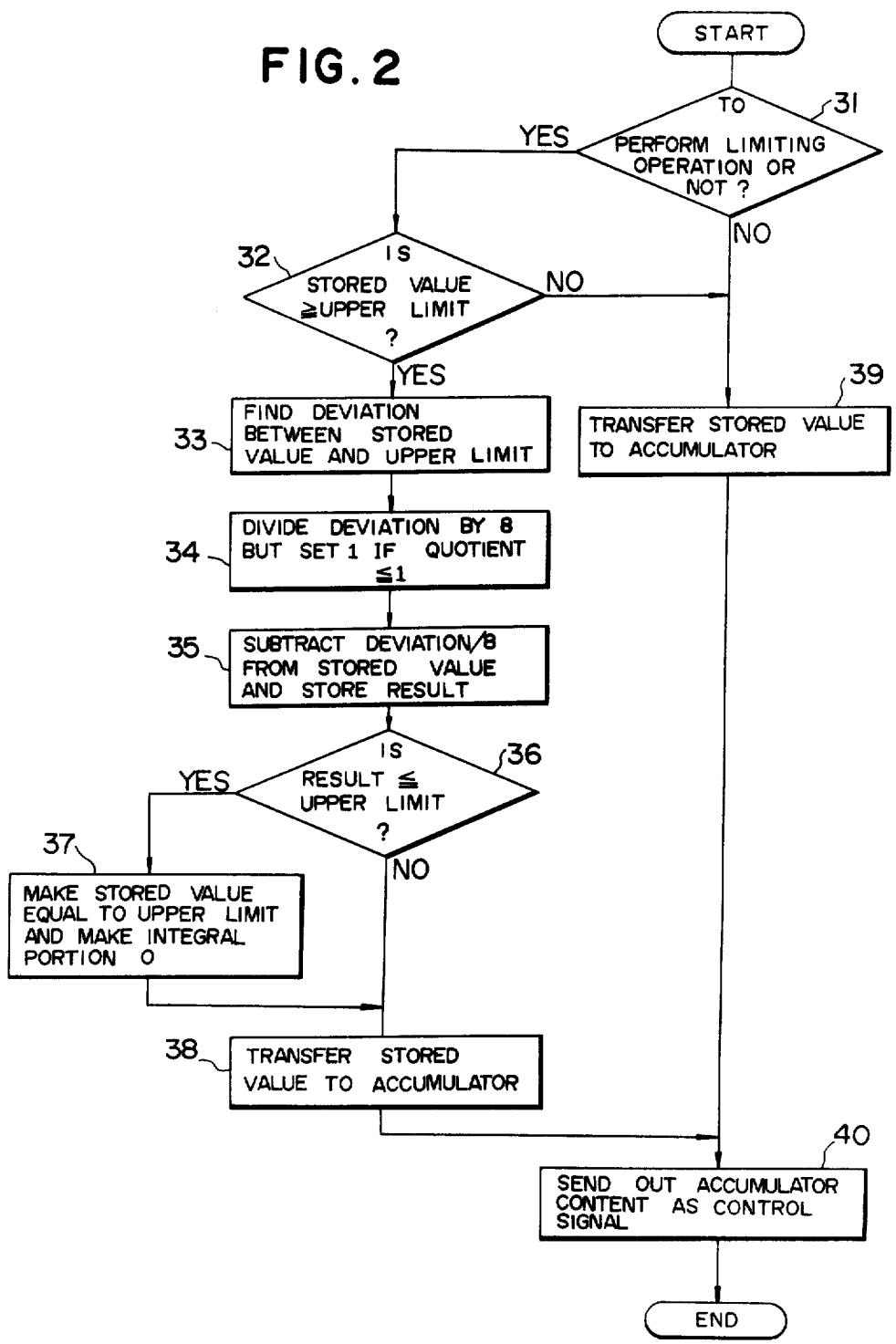

APPARATUS FOR CONTROLLING ROTATIONAL SPEED OF INTERNAL COMBUSTION ENGINE

BACKGROUND OF THE INVENTION

This invention relates to an apparatus and a method for controlling the rotational speed of an internal combustion engine mounted on a vehicle mainly during an idling operation, and more particularly relates to an apparatus and a method to control the rotational speed of the engine by limiting a value of a control signal which is varied to manipulate or control the amount of intake air of the engine.

Requirements have recently arisen for precise control of the rotational speed of an internal combustion engine even during idling periods in order to eliminate harmful components in the exhaust gases and to reduce unnecessary fuel consumption. Such requirements have led to the development of a feedback control system for controlling the amount of air entering the engine so as to bring the actual rotational speed of the engine closer to a desired value determined in accordance with engine operating conditions, such as temperature, for example. In such a system, when the actual rotational speed is below the desired value, the speed is increased by increasing the amount of intake air. However, this approach often causes problems as follows. If a brake is applied to slow down a vehicle while running with the transmission gear in a position other than the neutral position, the rotational speed of the engine is decreased with the decrease of the vehicle speed because the engine speed is restrained by the vehicle speed. Under such conditions the feedback control system operates to increase the amount of intake air so as to increase the actual rotational speed of the engine. However the actual rotational speed can not be increased because of the restraint of the vehicle speed and therefore the feedback control system operates to further increase the intake air amount. This sequence leads to an increase of the driving power or output power of the engine and a consequent reduction of the braking effect. Accordingly there is an unwanted or undesirable increase in the stopping distance necessary to slow down a running vehicle and to bring it to rest, as well as in brake pedal pressure necessary to attain the braking effect.

SUMMARY OF THE INVENTION

It is therefore an object of the present invention to provide an apparatus and a method for controlling the rotational speed of an internal combustion engine in which an excessive increase in the amount of intake air is restrained in the case of a predetermined engine operating condition where the problems mentioned above are liable to occur.

According to the present invention, the rotational speed of an internal combustion engine is measured by a measuring device and compared with a predetermined desired value by a comparing means which thus produces a deviation signal representative of a deviation between the measured rotational speed and the predetermined desired value. In accordance with the deviation signal, controlling means produces a control signal or an actuating signal conveying as data a value which changes in accordance with the value of the deviation signal. The control signal actuates regulating means for adjusting the amount of intake air in accordance with the value of the control signal so as to control the rotational speed of the engine to the predetermined desired value, thus forming a feedback control system. The value of the control signal is limited by a limiting means to be less than a predetermined upper limit in the case of a predetermined engine operating condition, thereby to restrain an excessive increase of the intake air. As the predetermined engine operating condition, detecting means detects the occurrence of an engine operating condition wherein all of the following terms are satisfied: (1) the position of the transmission connected to the engine is other than neutral, (2) the throttle valve of the engine is closed, (3) the rotational speed of the engine is within a predetermined range, (4) the vehicle speed is under a predetermined speed, and (5) the feedback control system is in operation.

Preferably the limiting means comprises decreasing means for decreasing the value of the control signal exponentially when the value of the control signal is larger than the upper limit. The control signal may comprise a proportional portion, due to a proportional action of the feedback control, and an integral portion due to an integral action. The limiting means may further comprise subtracting means for subtracting the integral portion from the control signal.

Preferably, the operation of the limiting means, as well as the operation of the feedback control, is performed by a programmed microcomputer.

BRIEF DESCRIPTION OF THE DRAWINGS

FIG. 2 is a flowchart showing the operation of an embodiment of the present invention.

DESCRIPTION OF THE PREFERRED EMBODIMENTS

Figure 1:
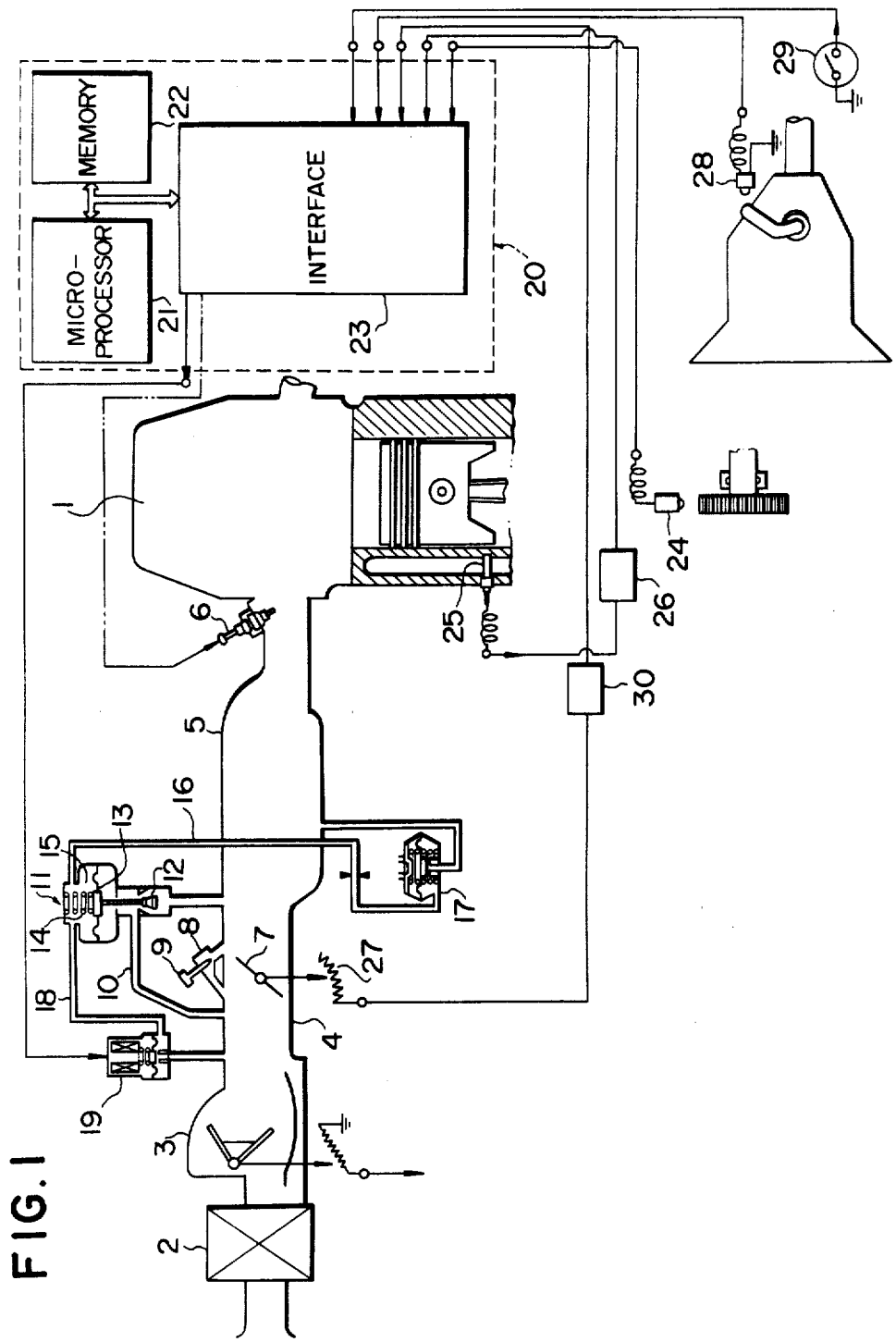
FIG. 1 is a block diagram schematically showing a complete embodiment of the present invention.

In an embodiment shown in FIG. 1, the present invention is applied to an internal combustion engine equipped with an electronic fuel injection control system. In FIG. 1 reference numeral 1 indicates an internal combustion engine body. Air is supplied to each cylinder of the engine 1 from an air cleaner 2 through an air flowmeter 3, throttle chamber 4 and each branch of intake manifold 5. Fuel is injected into each manifold branch, corresponding to each cylinder of the engine 1, by a fuel injector 6. The intake air flow is controlled by a throttle valve 7 which is disposed in the throttle chamber 4 and operated by an accelerator pedal. At idle the throttle valve 7 is almost fully closed. The air flow at idle thus passes through an idle port 8 and is adjusted by an idle adjustment screw 9 disposed in the idle port 8. At the same time the intake air flows through a bypass passage 10, bypassing the throttle valve 7, and is controlled by an idle control valve 11 disposed in the bypass passage 10.

The idle control valve 11 comprises a valve head 12 disposed in the bypass passage 10. A diaphragm 13 is linked with the valve head 12 and with a spring 14 applying a load on the diaphragm 13. The diaphragm and spring are disposed in a vacuum control chamber 15. Diaphragm 13 lifts the valve head 12 in accordance with the pressure in the vacuum control chamber 15, thus bringing the opening of the idle control valve 11 under control. The vacuum control chamber 15 communicates with the intake air conduit portion downstream of the throttle valve 7, or with the intake manifold 5, through a vacuum passage 16 having on its way a pressure regulator valve 17. The vacuum control chamber 15 also communicates with the intake air conduit portion upstream of the throttle valve 7 and downstream of the air cleaner through an air passage 18, having an electromagnetic valve 19 in its path. Thus the degree of opening of the electromagnetic valve 19 is controlled to control the amount of air entering the vacuum control chamber 15 and hence the pressure vacuum in the vacuum control chamber 15, thus bringing the opening degree of the idle control valve 11 under control.

The electromagnetic valve 19 is controlled by a microcomputer 20, for example.

The microcomputer 20 comprises a microprossor (a central processing unit) 21, a memory 22 and an interface 23. The interface 23 of the microcomputer 20 receives, as one of its input data, the rotational speed of the engine 1 in a digital form which is detected by a speed sensor 24 of an electromagnetic pickup type. In practice both a calibration pulse signal and a reference pulse signal indicative of reference angular position are fed into the interface 23 from a sensor for sensing an angular position of a crankshaft. The temperature of the engine, such as a temperature of the cooling water, is detected in an analog form by a temperature sensor 25 of a thermistor type in an analog form and fed into the interface 23 after conversion into a digital form by an analog-to-digital converter 26. A throttle valve switch 27 detects a full closed position of the throttle valve 7 of the engine 1 and sends an on-off signal to the interface 23. A neutral position switch 28 detects the neutral position of the transmission connected to the engine and sends an on-off signal to the interface 23. A vehicle speed switch 29 detects the predetermined speed of the vehicle and sends an on-off signal to the interface 23. In FIG. 1 the throttle valve switch 27 is depicted as an analog sensor having a variable resistor, and its output is converted into a digital form by an analog-to-digital converter 30. However, this arrangement can be replaced by an on-off switch to detect a full closed position of the throttle valve.

The desired revolutions per minute $R_D$, which is determined in accordance with the engine operating conditions such as a temperature is preliminarily stored in the memory 22.

The microprocessor 21 determines the condition of the engine operation from signals such as an output signal from the temperature sensor 25, reads out the desired revolutions per minute $R_D$ corresponding to the estimated engine operating condition, finds the actual revolutions per minute $R_A$ from an output signal from the speed sensor 24, and calculates the deviation $\Delta R$ between $R_D$ and $R_A$ ($\Delta R = R_A - R_D$).

The microprocessor 21 calculates a value of the control signal from the actual rotational speed $R_A$ and the deviation $\Delta R$. The control signal varies a pulse duty of a pulse signal to actuate the electromagnetic valve 19 in accordance with the value of the control signal. The valve 19 operates at a high frequency. The ratio of the open (ON) position to the closed (OFF) position of the valve is varied according to the pulse duty, and the amount of air entering into the vacuum chamber 15 is controlled. The opening of the idle control valve 11 is adjusted and the amount of air passing through the by-pass passage 10 is controlled or adjusted. Thus the feedback control of engine speed is achieved by manipulating the intake air amount so as to bring the actual rotational speed $R_A$ closer to the desired value $R_D$. The control signal may originally comprise a proportional portion due to a proportional action and an integral portion due to an integral action.

The microprocessor 21 decides whether or not to perform the feedback control in response to output signals from the throttle valve switch 27, the neutral position switch 28 and the vehicle speed switch 29, and other information such as conditions of fuel supply. The feedback control is performed only if a decision to do so is made. Otherwise, an open loop control is performed.

The microcomputer 20 performs a limiting operation, of limiting the value of the control signal to be below a predetermined upper limit, in the case of a predetermined engine operating condition.

Reference may here be made to FIG. 2. The operation of the flowchart shown in FIG. 2 is performed once in every cycle of the engine i.e. once per revolution of the engine, for example.

The program of the flowchart shown in FIG. 2 first decides whether or not to perform the operation of limiting the value of the control signal at a step 31. The decision step 31 determines the existence of an engine operating condition where the problems mentioned above are liable to occur. For example, the operating condition satisfying all of the following terms (1)-(5) is detected. That is, (1) the transmission position is other than neutral, (2) the throttle valve switch is ON (the throttle valve is fully closed), (3) the rotational speed of the engine is within a predetermined range (for example, 600–350 rpm), (4) the vehicle speed is under a predetermined value (12 km/h, for example), and (5) the feedback control is in operation. In case such an engine operating condition is found to exist, the answer of the step 31 is YES (to perform the limiting operation).

If the answer of the step 31 is YES, the program goes to a step 32 where it is decided whether a stored value of the control signal (which is a result of the feedback control operation mentioned above and stored temporarily in the memory) is larger than an upper limit (a value of the control signal that affords the intake air amount corresponding to an engine speed of 800-900 rpm, for example).

If the answer to either of steps 31 or 32 is NO, then the program goes to a step 39, where the stored value is transferred to an accumulator in the microprocessor 21, and then to a step 40, where the content of the accumulator is sent out as a control signal. In this case the stored value is directly sent out as an output signal.

If the answer to step 32 is YES, then the program goes to a step 33, where the deviation between the stored value and the upper limit is calculated, and then proceeds to steps 34 and 35. At the step 34 the deviation is divided by 8, which can be done by shifting the deviation to the right by three bits. At step 35 the program subtracts the resultant value of the step 34 from the stored value and stores the result of the subtraction in the memory as a new stored value to displace the old value. However, if the resultant quotient of the step 34 is less than one, the result of the step 34 is made equal to one.

Thus the value of the control signal is decreased gradually through the steps 33–35 so that the stability of the engine operation is maintained. A discontinuous and abrupt decrease of the value of the control signal would create problems in the engine operation. Furthermore, the value of the actuating signal is decreased exponentially through the steps 33–35, so that it can be brought to the upper limit rapidly even if it is much larger than the upper limit.

At a step 36 following the step 35, it is decided whether the result of the subtraction (the new stored value) is less than the upper limit. If the answer is NO, the program goes to a step 38 directly. If the answer is YES, it goes to the step 38 through a step 37.

At the step 37, the stored value is made equal to the upper limit and the portion of the stored value due to an integral control action is made equal to zero if an integral control action is employed. The reason for this is as follows: (1) If the stored value becomes less than the upper limit (the answer of step 36 is YES), the stored value is made equal to the upper limit so as to prevent it from becoming too small. (2) The actual rotational speed of the engine can not be increased and therefore the deviation from the desired value does not decrease in the operation of the feedback control system. This leads to a continuous increase of the portion of the stored value due to the integral action. If the system returns from the limiting operation to the normal feedback control with the integral portion of the control signal increased excessively, there is a possibility of an abrupt rise of the rotational speed. Such a possibility is eliminated by subtracting the integral portion and leaving the fixed portion only.

At the step 38 the new stored value is transferred to the accumulator and at the step 40 the content of the accumulator is sent out as an output control signal.

Thus the program of the flowchart shown in FIG. 2 performs the limiting operation, if a decision to do so is reached, by decreasing the stored value to the upper limit and holding it at that value when the stored value is larger than the upper limit, and by preventing the stored value from becoming larger than the upper limit when the stored value is less than the upper limit, whether initially or as a result of the limiting operation.

According to the present invention, an unwanted decrease of the braking effect which is caused by the feedback control system is prevented by limiting the value of the control signal, thereby to manipulate the intake air amount under the upper limit, in the case of the predetermined engine operating condition. Thus, the present invention eliminates an unwanted increase in a stopping distance necessary to slow down a running vehicle and to bring it to rest and in brake pedal pressure necessary to attain the braking effect.

Furthermore, the value of the control signal is decreased exponentially in an embodiment of the present invention so that it can be brought to the upper limit rapidly and smoothly even in the case where the value is much larger than the upper limit.

What is claimed is:

1. An apparatus for controlling the rotational speed of an internal combustion engine mounted on a vehicle, the apparatus comprising:
   a measuring device for measuring the rotational speed of the engine,
   comparing means for producing a deviation signal representative of a deviation between the measured rotational speed and a predetermined desired value,
   controlling means for producing a control signal conveying a value in accordance with the deviation signal produced by said comparing means,
   regulating means for controlling an amount of intake air entering the engine in accordance with the value of the control signal produced by said controlling means, thus forming a feedback control system for controlling the rotational speed of the engine,
   detecting means for detecting a predetermined operating condition of the engine where all of the following terms are satisfied, that is [1] the position of the transmission connected to the engine is other than neutral, [2] the throttle valve of the engine is closed, [3] the rotational speed of the engine is within a predetermined range, [4] the vehicle speed is under a predetermined speed, and [5] said feedback control system is in operation, and
   limiting means for limiting the value of the control signal values less than a predetermined upper limit in the case that the predetermined engine operating condition is detected by said detecting means thereby to restrain an excessive increase of the intake air.

2. A method of controlling the rotational speed of an internal combustion engine mounted on a vehicle, the method comprising the steps of:
   measuring the rotational speed of the engine;
   producing a deviation signal representative of a deviation between the measured rotational speed and a predetermined desired value,
   producing a control signal in accordance with said deviation signal,
   adjusting an amount of intake air entering the engine in accordance with the value of said control signal, thus achieving a feedback control for controlling the rotational speed of the engine,
   detecting a predetermined operating condition of the engine where all of the following terms are satisfied, that is, (1) the position of a transmission connected to the engine is other than neutral, (2) a throttle valve of the engine is closed, (3) the rotational speed of the engine is within a predetermined range, (4) the vehicle speed is under a predetermined speed, and (5) the feedback control is in operation, and
   restraining increases in the amount of intake air and in the output power of the engine by limiting the value of said control signal to be less than a predetermined upper limit when the predetermined engine operating condition is detected, thereby avoiding reduction of a breaking effect.

3. Apparatus for reducing increases in engine power by limiting a speed control signal for an internal combustion engine during braking conditions of a vehicle mounting the engine, comprising:
   (a) means for producing an engine speed control signal including:
      a measuring device for measuring the rotational speed of the engine;
      comparing means for producing a deviation signal representative of a deviation between the measured rotational speed and a predetermined desired value;
      controlling means for producing a control signal having a value determined as a function of the deviation signal produced by said comparing means; and
      feedback control means for controlling the rotational speed of the engine, having a regulating means for controlling an amount of intake air entering the engine, said regulating means connected to and responsive to said control signal generated by said controlling means;

(b) means for detecting the existence of a braking condition, said means for detecting producing a braking condition detection signal; and (c) limiting means for limiting the value of the control signal to values less than a predetermined upper limit, said limiting means being connected to and responsive to said braking condition detection signal, thereby to restrain an increase in the amount of intake air during a braking condition, whereby increases in stopping distance for a running vehicle are reduced;

(d) said means for detecting comprising:

first means for detecting engagement of a driving gear in a transmission for the internal combustion engine, and producing a first signal indicative of such engagement;

second means for detecting a substantially closed position of a throttle valve of said internal combustion engine and producing a second signal indicative of such a closed position;

third means for detecting a rotational speed of the internal combustion engine within a predetermined range and producing a third signal indicative of such a condition of the rotational speed;

fourth means for detecting a vehicle speed below a predetermined speed and producing a fourth signal indicative of such a condition of the vehicle speed; and fifth means for producing said braking condition detection signal responsive to a simultaneous presence of each of said first, second, third and fourth signals.

4. A method for reducing increases in engine power by limiting a speed control signal for an internal combustion engine during braking conditions of a vehicle mounting the engine, comprising the steps of:

measuring the rotational speed of the engine;

comparing the rotational speed with a predetermined desired value thereof;

producing a deviation signal representative of a deviation between the measured rotational speed and the predetermined desired value;

producing a control signal in accordance with said deviation signal;

controlling the rotational speed of the engine by adjusting the amount of intake air entering the engine in accordance with the value of the control signal;

detecting the existence of a braking condition by a sequence including the steps of:

detecting a first condition of engagement of a driving gear in a transmission for the internal combustion engine;

detecting a second condition of a substantially closed position of a throttle valve of the internal combustion engine;

detecting a third condition wherein a rotational speed of the internal combustion engine is within a predetermined range therefor;

detecting a fourth condition wherein the vehicle speed is below a predetermined upper limit therefor;

producing a braking condition detection signal in response to the simultaneous detection of all of the first, second, third and fourth conditions; and restraining an increase in the amount of intake air for the internal combustion engine during a braking condition by limiting the value of the control signal to values less than a predetermined upper limit in response to said braking condition detection signal, thereby restraining an increase in the output power of the engine and increasing the effective braking power applied thereto during a braking condition.

5. A method for reducing increases in engine power by limiting a speed control signal for an internal combustion engine during braking conditions of a measuring the rotational speed of the engine;

comparing the rotational speed with a predetermined desired value thereof;

producing a deviation signal representative of a deviation between the measured rotational speed and the predetermined desired value;

producing a control signal in accordance with said deviation signal;

controlling the rotational speed of the engine by adjusting the amount of intake air entering the engine in accordance with the value of the control signal;

detecting the existence of a braking condition;

producing a braking condition detection signal responsive to the existence of a braking condition; and restraining an increase in the amount of intake air for the internal combustion engine during a braking condition by performing the following sequence:

(a) determining whether the braking condition exists;

(b) determining whether the value of the control signal exceeds an upper limit therefor representing a predetermined maximal operating speed;

(c) if either of the preceding determining steps results in a negative response, transferring the control signal value to a storage therefor;

(d) otherwise, (i) reducing the value of the control signal and (ii) transferring the reduced value of the control signal to the storage therefor; and wherein the controlling step comprises the further steps of obtaining a stored value of the control signal from the storage therefor and applying the stored value to a control means for controlling the amount of intake air entering the engine;

thereby restraining an increase in the output power of the engine and increasing the effective braking power applied thereto during a braking condition.

6. An apparatus as claimed in claim 1, wherein said limiting means comprises decreasing means for decreasing the value of the control signal exponentially when the value of the control signal is larger than the upper limit.

7. An apparatus as claimed in claim 1 or 6, wherein the control signal comprises a proportional portion due to a proportional control action and an integral portion due to an integral control action.

8. An apparatus as claimed in claim 7, wherein said limiting means comprises subtracting means for subtracting the integral portion from the control signal.

9. An apparatus as claimed in claim 1, wherein said detecting means comprises a neutral portion switch to detect the neutral position of the transmission, a throttle valve switch to detect the closed position of the throttle valve and a vehicle speed switch to detect a condition in which the vehicle speed is under the predetermined speed.

10. An apparatus as claimed in claim 1, wherein said limiting means is a microcomputer so programmed as to perform the operation of said limiting means.

11. An apparatus as claimed in claim 1, wherein the predetermined range of the rotational speed of the engine is 600-350 rpm.

12. An apparatus as claimed in claim 1, wherein the predetermined speed of the vehicle is 12 km/h.

13. An apparatus as claimed in claim 1, wherein the predetermined upper limit is a value of the control signal which affords the intake air amount corresponding to the rotational speed of 800-900 rpm.

14. An apparatus as recited in claim 3 wherein said limiting means comprise decreasing means for decreasing the value of the control signal exponentially when the value of the control signal is larger than the upper limit.

15. The method recited in claim 5 wherein the reducing step comprises the further steps of:
   (a) determining a difference between the value of the control signal and the upper limit therefor;
   (b) dividing the determined deviation by a predetermined quantity;
   (c) determining whether the resulting quotient is below a particular value;
   (i) setting the resulting quotient equal to the particular value if the result of the determining step is positive; and
   (ii) retaining the quotient otherwise;
   (d) subtracting the quotient obtained in the setting step from the value of the control signal;
   (e) providing the difference obtained in the subtracting step as a new value for the control signal; and
   (f) storing the new value for the control signal in the storage therefor.

16. The method recited in claim 15 wherein said providing step comprises the further steps of:
   (a) determining whether the difference obtained in said subtracting step exceeds the upper limit;
   (i) continuing with the providing step if the result of the foregoing determining step is positive;
   (ii) setting the difference equal to the upper limit if the result of the foregoing determining step is negative;
   (b) setting a portion of the difference obtained in the subtracting step due to an integral control action equal to zero; and
   (c) continuing with the providing step.

* * * * *